Figure 5:
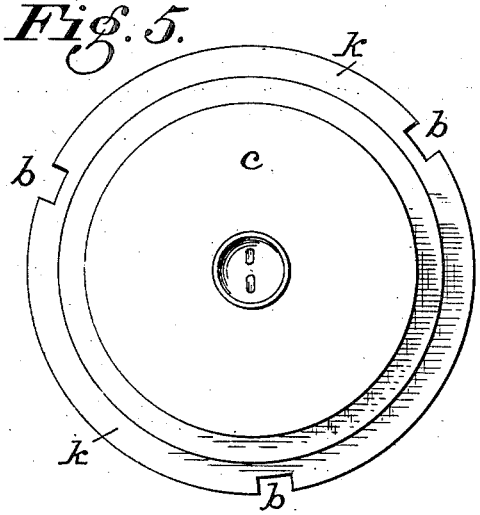

No. 704,493. Patented July 15, 1902.
C. C. ARMSTRONG.
SEALING ATTACHMENT.
(Application filed Mar. 5, 1901.)
(No Model.) 2 Sheets—Sheet 1.
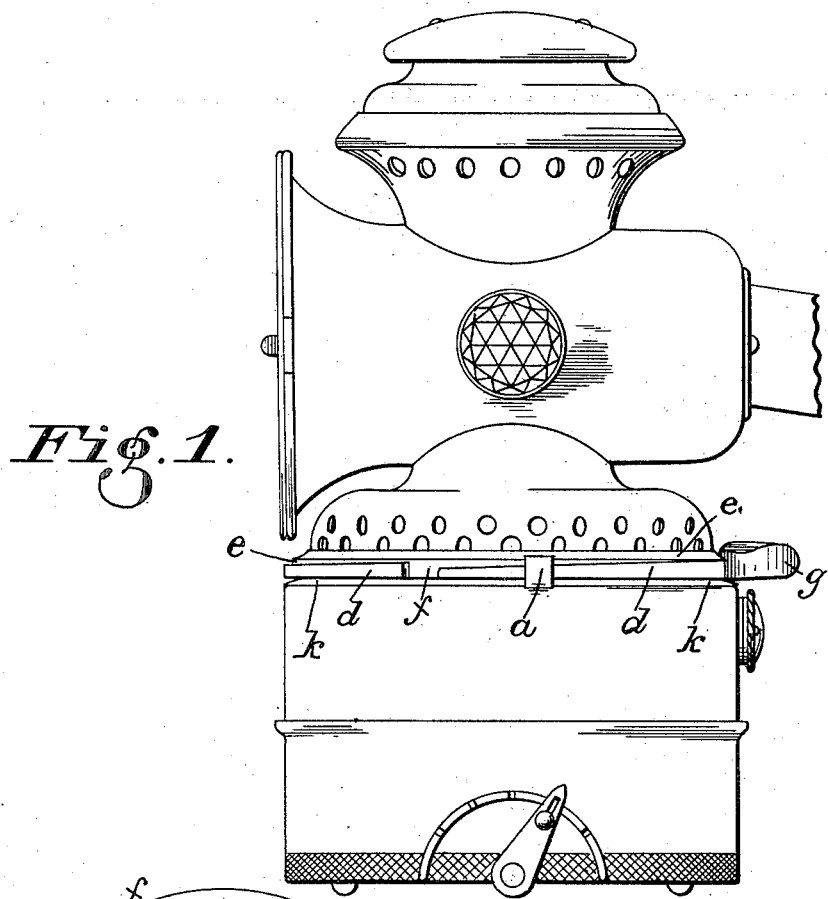
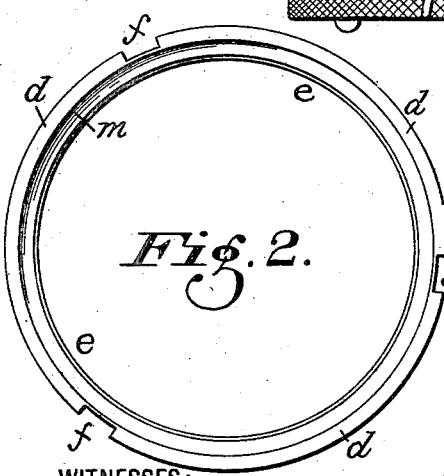
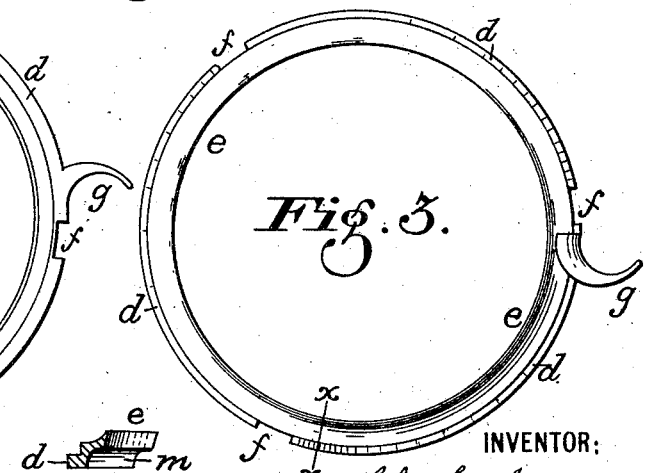
WITNESSES:
Knox F. Hutchison
Lindley G. Long
INVENTOR:
Chas. C. Armstrong
BY
Frank M. Burnham.
ATTORNEY.

No. 704,493. Patented July 15, 1902.
C. C. ARMSTRONG.
SEALING ATTACHMENT.
(Application filed Mar. 5, 1901.)
(No Model.) 2 Sheets—Sheet 2.

WITNESSES:
Knox F. Hutchison
Lindley G. Long.

INVENTOR:
Chas. C. Armstrong,
BY
Frank M. Burnham
ATTORNEY.

UNITED STATES PATENT OFFICE.

CHARLES CARROLL ARMSTRONG, OF COLUMBUS, OHIO.

SEALING ATTACHMENT.

SPECIFICATION forming part of Letters Patent No. 704,493, dated July 15, 1902.

Application filed March 5, 1901. Serial No. 49,813. (No model.)

*To all whom it may concern:*

Be it known that I, CHARLES CARROLL ARMSTRONG, a citizen of the United States, residing at Columbus, in the county of Franklin and State of Ohio, have invented certain new and useful Improvements in Sealing Attachments; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a sealing attachment for acetylene-gas lamps, &c., or, otherwise expressed, means for hermetically closing of joints, and my improved attachment is susceptible of being applied to various receptacles; but in the instance here illustrated and described I have shown its practical application in connection with an acetylene-gas lamp when used in sealing the joint to the gas-chamber of the generator and for which purpose it is especially adapted, thus doing away with the ordinary screw-threads as a method of making a gas joint or seal, which is very objectionable for the reason that the chemical action of calcium carbid is such that the threads soon become corroded with a sticky slimy substance which when cool sets and becomes hard, thereby frequently preventing the removal of the cover of the gas-chamber and the separation of the parts, even when the strength of a man is exerted upon it; but my improved sealing attachment obviates the above defects, and at the same time it provides a more perfect seal than by the old method in which in screwing a cover or lid down sufficiently tight to make a seal the gasket or packing between the joints has a tendency to pucker, thus necessitating a strong pressure and making it very difficult to unscrew, as the rubber gasket while thus puckered becomes set to the parts caused by said chemical action. My improvement, however, overcomes this defect, as the pressure is directly downward, there being no movement of the lid on the rubber gasket, the seal being made by the hooked arms engaging the flanges on the locking-ring, the beads or flanges being on an incline, so as to be much deeper or wider on one side, so that by giving a half-turn to the generator or locking-ring will cause the arms to move up said incline, thereby causing the direct downward pressure, as hereinbefore referred to. It will thus be seen that a greater pressure is obtained and with less friction by my improvement than by the old method of screw-threads, while at the same time providing an efficient means for attaching the generator to the lamp-body.

My invention consists in certain novel and peculiar features of construction and arrangement, as will be fully described hereinafter and pointed out in the subjoined claims, in accordance with the statutes in such cases made and provided therefor.

Figure 6:
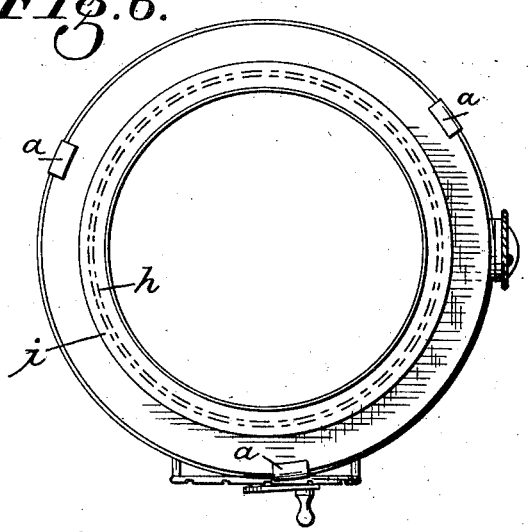
Figure 7:
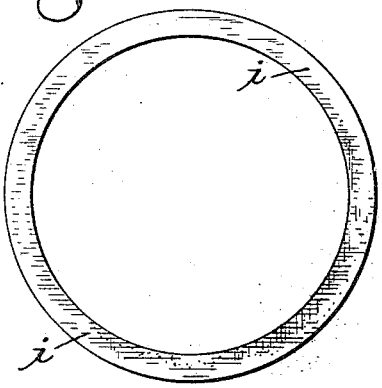
Figure 8:
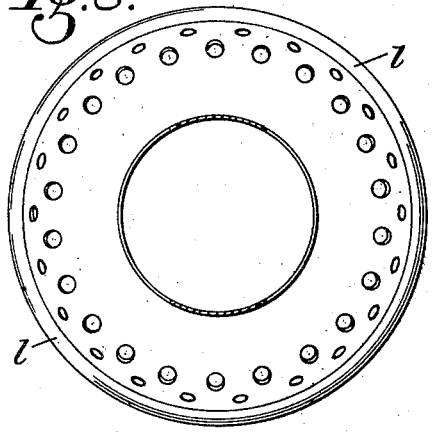
Figure 9:
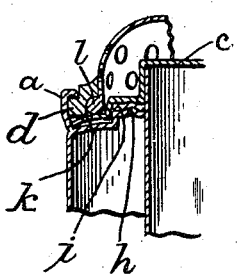

In the accompanying drawings, illustrating the practical application of my invention, Figure 1 is a side elevation of an acetylene-gas lamp provided with my improved sealing attachment. Fig. 2 is a plan view of the lower or under side of the locking-ring, so as to show the inclined locking-flanges and spaces or recesses between each for the hooked arms. Fig. 3 is a plan view of the top or upper side of the locking-ring, so as to show the inclined locking-flanges and spaces or recesses between each for the hooked arms. Fig. 4 is a detail view in perspective of a portion of the locking-ring having one end in cross-section, so as to show the exact contour or outline of its form and taken on the line $x\,x$ of Fig. 3. Fig. 5 is a plan view, looking on the top, of the cover or lid which rests over the carbid-chamber of the gas-generator, showing the recesses or cuts which pass over and rest in position around each of the hooked arms. Fig. 6 is a plan view of the top of the gas-generator with cover or lid removed, so as to show the position of the hooked arms. Fig. 7 is a plan view of the gasket or packing-ring. Fig. 8 is a plan view of the chimney position with its neck in cross-section and with its top portion and the lamp-body removed, so as to show the annular bead at its base which is held in position under the locking-ring; and Fig. 9 is a sectional view of a portion of the outer shell or casing of the generator and the base of the chimney, both being broken away, so as to show in section the locking-ring and also one of the hooked arms.

Referring in detail to the various parts of my improved sealing attachment by means of the letters of reference, a designates the hooked arms, consisting of a sufficient number as desired, which are formed on the top of the gas-generator and are adapted to fit in and over recesses b of cover or lid c, thus holding said cover, which fits on the top of the gas-generator, in position and also acts as bearings for the inclined flanges d of locking-ring e, said flanges or beads being thicker or deeper at one end and gradually inclining or tapering toward the other, as clearly shown in Fig. 1, and being of an equal number to the hooked arms a, so that each of said flanges will always rest or bear against each of said hooked arms when the parts are all together and the locking-ring is in operative position, and by turning said locking-ring so that the inclination of the flanges is pressed forward or backward—i. e., to the left or the right—through the hooked arms the ring is tightened or locked and the joint then sealed or the ring is loosened or unlocked and the joint is unsealed or broken. Locking-ring e is provided with recesses f, which are formed by the spaces left between the inclined flanges, (see Figs. 2 and 3,) which permit of the ring being passed over the bent top or hooked end of arms a when adjusted in position or when it is desired to entirely remove said locking-ring from the lamp after the chimney-top and lamp-body have been removed for this purpose. The locking or sliding ring e is further provided with a handle or finger-hold g, by which it may be operated. The top of the generator is preferably formed with an annular beading h, (see dotted lines, Fig. 6, and solid lines, Fig. 9,) over which is placed the rubber gasket i and on which rests the rim k of cover c, (see Fig. 9,) so that when all the parts, including said locking-ring, are in position by simply moving or turning the locking-ring e, by placing the finger in the handle g toward the left, inclined flanges d, on account of their increased width or depth, as they pass or move through the hooked arms a will increase the binding tension, thus pressing the rim k of the cover tightly but firmly down upon the gasket i, which by reason of the annular beading h will insure a perfectly gas and air tight joint, and at the same time the chimney will be held firmly in position by reason of its bead l coming in contact or engagement with the annular groove or concavity m of the locking-ring e.

My improved attachment not alone affords a secure and simple means for perfectly sealing joints of various receptacles, but also makes a secure means for firmly connecting various parts of a device, and when used on a lamp constructed with an oil font or reservoir similar to the one shown in Patent No. 614,315, granted to me under date of November 15, 1898, it prevents any rattle or noise caused by a jar and so common in this and all lamps of ordinary construction.

It will of course be understood that I do not limit myself to the exact form of construction herein shown and described, as my sealing attachment is susceptible of slight modifications and alterations, as will suggest themselves to any mechanic, according to the device to which it is to be attached, without departing from the spirit or principles of my invention. As, for instance, if so desired the locking or sliding ring can be entirely dispensed with by forming the base of the chimney of sufficient size and provided with the proper number of inclined flanges as there are hooked arms, also with the spaces left between of proper size so as to form the recesses to receive the hooked arms, substantially the same as the locking-ring, thus making said chimney answer the same purpose.

Having now described my sealing attachment, what I claim as new and as my invention is—

1. In a sealing attachment for acetylene lamps, the combination with the gas-generator, of the gasket composed of suitable material; a cover or lid the flange or rim of which rests firmly but detachably on said gasket; a chimney-base, the bead of which fits on the rim of said cover; a locking-ring provided with flanges; said flanges being adapted to operate in conjunction with suitably-arranged hooked arms attached to said gas-generator, so as to tighten or loosen the parts, thereby opening or hermetically closing said joint, substantially as described.

2. The combination in an acetylene-gas lamp with the generator, said generator being provided with means for securely connecting the parts, and formed with an annular beading; of a suitable gasket or packing; a cover or lid provided with a rim; a chimney the base of which is provided with a bead adapted to rest on said rim; a locking-ring adapted to rest over and on the bead of said chimney, said locking-ring being provided with flanges, and recesses, so that said ring is adapted in conjunction with the securing-arms of said generator, to operate in opening or hermetically closing or opening the joint of the gas-generator, substantially as described.

In testimony whereof I have affixed my signature in presence of two witnesses.

CHARLES CARROLL ARMSTRONG.

Witnesses:
V. W. JONES,
MARY L. ARMSTRONG.